United States Patent [19]

Jones

[11] 4,035,557
[45] July 12, 1977

[54] POLYMERIC MATERIALS WITH SILANE END GROUPS

[75] Inventor: Frank N. Jones, Louisville, Ky.

[73] Assignee: E. I. Du Pont de Nemours and Company, Wilmington, Del.

[21] Appl. No.: 622,430

[22] Filed: Oct. 14, 1975

Related U.S. Application Data

[63] Continuation-in-part of Ser. No. 329,156, Feb. 2, 1973, abandoned, which is a continuation-in-part of Ser. No. 133,424, April 12, 1971, abandoned, which is a continuation-in-part of Ser. No. 39,533, May 21, 1970, abandoned.

[51] Int. Cl.² .......................................... C08F 20/18
[52] U.S. Cl. ............................. 526/14; 260/77.5 R; 260/78 UA; 260/79.5 R; 260/79.5 C; 260/79.5 NV; 526/11.1; 526/21; 526/29; 526/30; 526/49; 526/56; 526/23
[58] Field of Search ............... 260/448.8 R, 78 UA, 260/78 A, 77.5 R, 77.5 MA, 77.5 AP, 77.5 AT, 77.5 A, 77.5 CR, 77.5 AM, 78.41, 79.5 R, 79.5 C, 79.5 NV; 526/11.1, 14, 30, 49, 29, 56

[56] References Cited

U.S. PATENT DOCUMENTS 3,317,461   5/1967   Plueddemann ..................... 260/79

OTHER PUBLICATIONS

Hackh's Chemical Dictionary, Fourth Edition, 1969, p. 197.

Primary Examiner—Harold D. Anderson

[57] ABSTRACT

Polymeric materials represented by the general structure

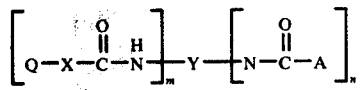

where
Q is a polymeric setment of ethylenically unsaturated monomers, lacking Zerewitinoff hydrogen atoms;
X is the residue of a chain transfer agent;
Y is the residue of a di-, tri, or tetraisocyanate radical after removal of isocyanage groups;
A is the residue of a mercapto-, hydroxy-, or aminoalkyl alkoxy silane radical; and
$m$ and $n$ are 1, 2 or 3, (the total not exceeding 4), are useful as pigment dispersing aids in coating compositions.

8 Claims, No Drawings

POLYMERIC MATERIALS WITH SILANE END GROUPS

CROSS-REFERENCE TO RELATED APPLICATIONS

This application is a continuation-in-part of application Ser. No. 329,156, filed Feb. 2, 1973; which in turn is a continuation-in-part of application Ser. No. 133,424, filed Apr. 12, 1971; which in turn is a continuation-in-part of application Ser. No. 39,533, filed May 21, 1970, all now abandoned.

STATEMENT OF THE INVENTION

This invention relates to polymeric materials. It is more particularly directed to polymeric materials represented by the structure

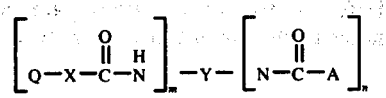  (1)

where
Q is a polymeric segment of ethylenically unsaturated monomers, lacking Zerewitinoff hydrogen atoms; Zerewitinoff hydrogen atoms;
X is the residue of a chain transfer agent;
Y is the residue of a di-, tri-, or tetraisocyanate radical after removal of isocyanate groups;
A is the residue of a mercapto-, hydroxy-, or aminoalkyl alkoxy silane radical; and
$m$ and $n$ are 1, 2 or 3, (the total not exceeding 4).
Where $n$ is 2 or 3, only one of A need be as defined.

UTILITY

The polymeric materials of the invention are useful as aids for dispersing solid particles in organic liquids.

They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, quinacridone, "Irgazin" yellow, ferric hydrates and the like.

Pigment dispersions made with the polymeric materials of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymeric material of the invention can have a significantly high pigment content, while retaining the same degree of fluidity, than when conventional aids are used.

The polymeric materials of the invention can be used as pigment dispersing aids by dissolving from 0.001 to about 2.00 grams of polymeric material per square meter[1] of surface area of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols and mixtures of these.

[1] Measured by the Brunauer, Emmett and Teller nitrogen adsorption method described on pp. 29–32 of "Colloidal Dispersions" by Earl K. Fischer, published by John Wiley and Sons in 1950.

An appropriate amount of pigment is then added to the solution, which is then subjected to shear, as by sand-grinding or ball-milling, to deagglomerate and disperse the pigment. This pigment dispersion or mill base can then be added directly to a paint in the usual way and amount.

Polymeric materials of the invention preferred for use as pigment dispersing aids are those of formula (1) wherein A is a silane radical of the formula

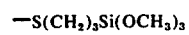

or

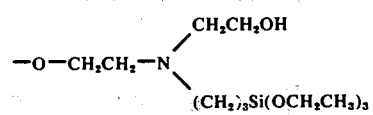

Also preferred are the polymeric materials of formula (1) wherein Q is a resinous or non-resinous polymeric or copolymeric segment of
a. an ester of acrylic acid (AA) or methacrylic acid (MAA) with an alkanol of 1–18 carbon atoms;
b. styrene or acrylonitrile;
c. a vinyl ester whose ester moiety contains 2–18 carbon atoms; or
d. a vinyl ether.

"Resinous", as used in this context, refers to a polymeric segment having a number average molecular weight of about 10,000–100,000. "Non-resinous", as used in this context, refers to a polymeric Q segment having a number average molecular weight of 500–10,000.

Number average molecular weight is determined by dynamic membrane osmometric techniques using a Mechrolab 501 Osmometer, sold by the Mechrolab, Inc. division of Hewlett-Packard Co., Mountain View, California.

Especially preferred are those polymeric materials of formula (1) wherein Q is a resinous or non-resinous
1. polymeric segment one of whose monomer units is methyl methacrylate (MMA),
2. copolymeric segment of MMA and an ester of AA or MAA with an alkanol of 2–12 carbon atoms, or
3. MMA 2-ethylhexyl acrylate (2-EHA) copolymeric segment.

Polymeric materials of the invention also preferred are those of formula (1) wherein X is

where R is alkylene of 1–6 carbon atoms, and

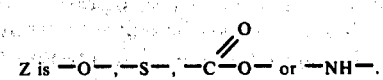

Also especially preferred are those polymeric materials of formula (1) wherein Y is

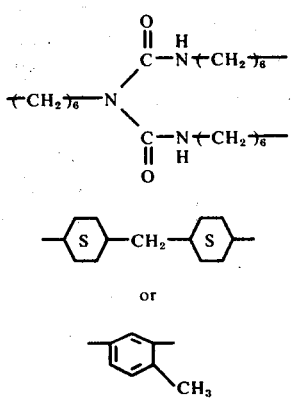

The polymeric material most preferred for use as a pigment dispersing aid is that represented by the structure

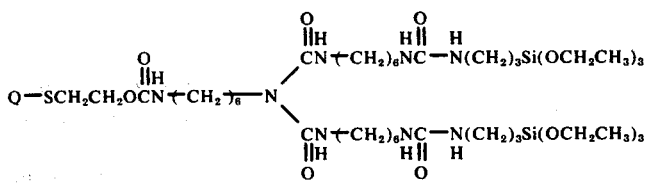

where Q is a MMA/2-EHA polymeric segment.

PREPARATION OF THE POLYMERIC MATERIALS

The materials of the invention can be prepared according to the typical equation 1. MMA + 2EHA + HSCH$_2$CH$_2$OH → MMA/2EHA polymer.SCH$_2$CH$_2$OH (2) MMA/2EHA polymer . SCH$_2$CH$_2$OH + OCN–⟨S⟩–CH$_2$–⟨S⟩–NCO ⟶

MMA/2EHA polymer . SCH$_2$CH$_2$OCN(H)–⟨S⟩–CH$_2$–⟨S⟩–NCO (3) MMA/2EHA polymer . SCH$_2$CH$_2$OC(O)–N(H)–⟨S⟩–CH$_2$–⟨S⟩–NCO +

H$_2$N(CH$_2$)$_3$Si(OCH$_2$CH$_3$)$_3$ ⟶

MMA/2EHA polymer . SCH$_2$CH$_2$OC(O)–N(H)–⟨S⟩–CH$_2$–⟨S⟩NC(O)–N(H)–(CH$_2$)$_3$Si(OCH$_2$CH$_3$)$_3$ According to this scheme, a suitable organic liquid such as toluene, methylethyl ketone, methylisobutyl ketone, butyl acetate, ethyl acetate, benzene, xylene, an ether such as ethylene glycol diethyl ether or Cellosolve acetate, or mixtures of these, is brought to a temperature of 50°–120° C. To this organic liquid is then added, over a 1–6 hour period, a solution of the monomer(s) which is to produce the polymeric segment B of the polymeric material, a chain transfer agent bearing a functional group such as 2-mercaptoethanol, 3-mercaptopropanol, 2-mercaptoethylamine or 2-hydroxyethyl disulfide, and a free radical polymerization initiator such as azobisisobutyronitrile.

One chooses the proportions of monomer, chain transfer agent and initiator according to the formula $$MW_n = \frac{\text{total mols monomer}}{\text{total mols transfer agent} + X(\text{mols of catalyst})}$$

(where X is the number of free radicals per mol of catalyst and $MW_n$ is the number average molecular weight of the polymer desired).

It is desirable that the monomer, chain transfer agent and initiator be in solution. If they are not, enough of an appropriate solvent should be added to put them into solution.

The reaction mass is then heated at 50°–120° C. until reaction is about 95% complete, as determined by viscosity measurements. Ordinarily, at completion, the mass has a Gardner-Holdt viscosity of F to N. Four to five hours of reaction time is ordinarily enough.

An appropriate di-, tri-, or tetraisocyanate, in an amount equimolar to the chain transfer agent, is then added to the reaction mass, still at elevated temperature. Illustrative of isocyanates which can be used are

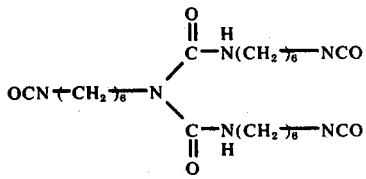

(Desmodur N, sold by Farbenfabriken Bayer, AG.)

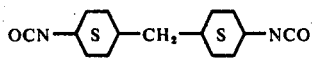

("Hylene" W organic isocyanate, sold by E. I. du Pont de Nemours and Company)

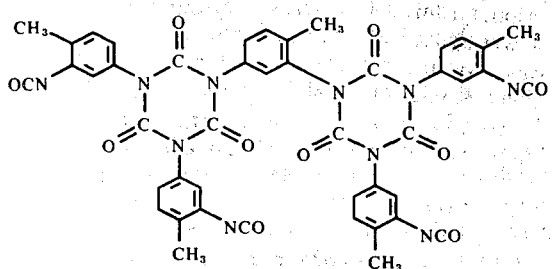

(Desmodur IL, sold by Farbenfabriken Bayer, AG)

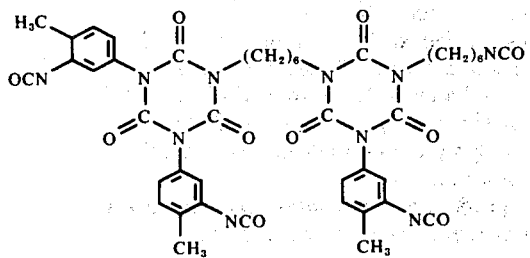

(Desmodur HL, sold by Farbenfabriken Bayer, AG) and toluene diisocyanate

A catalyst for the isocyanate reaction is then added to the reaction mass. Illustrative of such catalysts are dibutyltin dilaurate and tertiary amines such as triethylenediamine. The amount of isocyanate reaction catalyst used is normally 0.5 to about 2%, by weight of the isocyanate used.

The reaction mass is then heated until the isocyanate-chain transfer agent reaction is complete. This ordinarily takes about from 5–60 minutes at 80° C.

The reactant which provides the A moiety of the polymeric material is then added as a solution, preferably dry, in one of the organic liquids previously mentioned. The amount used is about 0.8–1, preferably 0.95 molar, based on the unreacted isocyanate. The reaction mass is then heated to about 25° C., with stirring, for another fifteen minutes.

The organic liquid can be stripped from the reaction mass by heating under vacuum to give a polymeric material of the invention. In practice, the product is ordinarily used in solution, as prepared.

If mixtures of polymeric materials are produced by these reactions, the materials can be isolated by chromatography.

PREFERRED EMBODIMENTS OF THE INVENTION

The following examples are submitted so that the invention may be more readily understood and practiced.

Those skilled in the art will, no doubt, be able to compose numerous variations on their central theme, such as the attachment of innocuous substituents to the molecule of the polymeric material. It is naturally considered that these variations are a part of the invention.

In the examples, all parts are by weight.

EXAMPLE 1

Methylethyl ketone (241.9 parts) was placed in a steel reaction kettle, heated to reflux temperature and held there. A solution of 219.9 parts of MMA, 131.9 parts of 2-EHA, 66 parts of methylethyl ketone, 4.3 parts of 2-mercaptoethanol and 0.88 parts of azobisisobutyronitrile was then slowly added to the kettle over a four-hour period.

Refluxing was continued as a solution of 0.22 part of azobisisobutyronitrile in 4.2 parts of methylethyl ketone was added in three equal portions at 15-minute intervals. Refluxing was then continued for another 30 minutes.

Desmodur N (43.21 parts) was then added to the reaction mass and its container rinsed with 11 parts of methylethyl ketone, which was also added to the mass. The mixture was stirred for 5 minutes.

Dibutyltin dilaurate (0.50 part) was then added and its container rinsed with 4.4 parts of methylethyl ketone, which was also added to the mixture.

This solution was refluxed for two hours. The solution was then cooled to about 65° C. and stirred as 24.4 parts of γ-aminopropyltriethoxy silane were added. The container was rinsed with 33.6 parts of methylethyl ketone, which was also added to the solution. Stirring was continued for 15 minutes.

The resulting product was a solution, 48% solids, containing a polymeric material represented by the formula

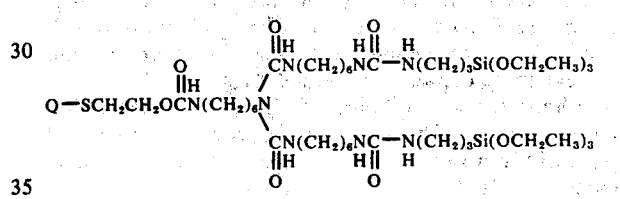

where Q is a MMA/2-EHA polymeric segment.

A mixture of 0.82 part of this solution, 2 parts of phthalocyanine blue pigment and 17.2 parts of xylene was sand-milled for 30 minutes. The resulting dispersion was well deflocculated.

EXAMPLE 2

Toluene (300 parts) was placed in a reaction flask, heated to reflux temperature and held there. To the toluene was then added, continuously over a four hour period, a solution of 1700 parts of ethyl acrylate (EA), 544 parts of butyl acrylate (BA), 287 parts of octadecyl methacrylate (OMA), 1300 parts of toluene, 8.2 parts azobisisobutyronitrile and 53.13 parts of 2-mercaptoethanol.

Refluxing was continued while 6 parts of azobisisobutyronitrile were added in three equal portions at fifteen minute intervals. The container was then rinsed with 100 parts of toluene, which was added to the reaction mass.

This solution (3620 parts), 448 parts of Desmodur N and 1 part of dibutyltin dilaurate were mixed and stirred at reflux temperature for 2.5 hours. The mixture was then cooled to 40° C. and 261 parts of α-aminopropyl triethoxysilane were added.

This solution was then refluxed for one-half hour to give a solution, 64% solids, containing a polymeric material represented by the formula

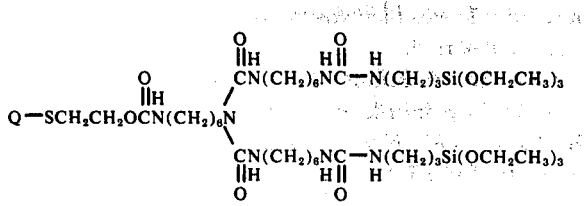

where Q is an EA/BA/OMA terpolymer segment.

EXAMPLE 3

A polymeric material represented by the formula

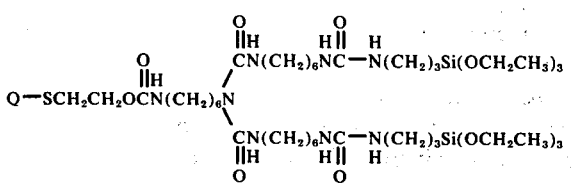

where Q is a MMA/vinyl acetate polymer segment was prepared by the procedure of Example 2, using 1200 parts of MMA and 515 parts of vinyl acetate instead of the EA, BA and OMA, and benzene instead of toluene.

EXAMPLE 4

Methylisobutyl ketone (908 parts) and methylethyl ketone (100 parts) were placed in a reaction vessel, heated to reflux temperature and held there. To the solvent mixture was then added continuously, over a four hour period, a solution of 916 parts of MMA, 544 parts of 2EHA, 275 parts of methylisobutyl ketone, 3.7 parts of azobisisobutyronitrile and 17.9 parts of 2-mercaptoethanol.

Refluxing was continued while a solution of 2.8 parts of azobisisobutyronitrile in 28 parts of methylisobutyl ketone was added in 3 equal portions at 15 minute intervals. Solvent (250 parts) was distilled out and refluxing was continued for another thirty minutes, with water removal.

A 75% solution of hexamethylene diisocyanate monobetaine in a 50/50 mixture of xylene and 2-ethoxyethyl acetate (174.6 parts) was then added to this solution and its container rinsed with 20 parts of methylisobutyl ketone, which was also added.

Dibutyltin dilaurate (1.5 parts) was then added and the solution heated at reflux temperature for 45 minutes and then cooled to 60–70° C.

To this solution were added 96.6 parts of γ-aminopropyltriethoxy silane. The solution was then stirred for fifteen minutes to give a solution, 58% solids, containing a polymeric material represented by the formula

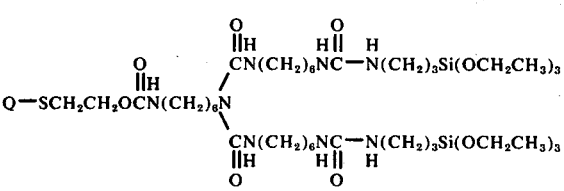

where Q is a MMA/2-EHA polymer segment

EXAMPLE 5

Toluene (226.7 parts) was placed in a steel reaction kettle, heated to reflux temperature and held there. A solution of 226.7 parts of MMA, 126 parts of 2-EHA, 90.7 parts of toluene, 4.44 parts of 2-mercaptoethanol and 0.903 part of azobisisobutyronitrile was then slowly added to the kettle over a four hour period.

Refluxing was continued as a solution of 0.25 part of azobisisobutyronitrile and 2.5 parts of methylisobutyl ketone was added in three equal portions at 15 minute intervals. A water separator was attached to the kettle and refluxing was continued for another 45 minutes to remove water.

Desmodur N (43.21 parts) was then added to the reaction mass and its container rinsed with 3.78 parts of toluene, which was also added to the mass. The mixture was stirred for five minutes.

Dibutyltin dilaurate (0.51 part) was then added and its container rinsed with 1.89 parts of toluene, which was also added to the mixture.

This solution was refluxed for one hour.

The product was then mixed with 1 mol of γ-mercaptopropyltrimethoxy silane per equivalent of isocyanate in the polymeric intermediate. The reaction was complete in 45 minutes.

The product was a solution containing a polymeric material represented by the formula

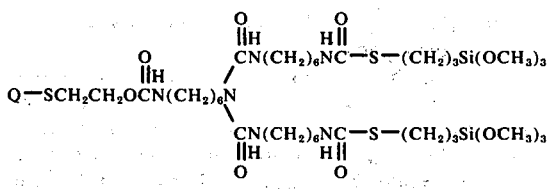

where Q is a MMA/2-EHA polymer segment.

I claim:

1. A polymeric material represented by the structure

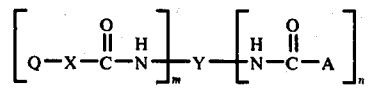

where
Q is a resinous polymeric or copolymeric segment of
  a. an ester of acrylic acid or methacrylic acid with an alkanol of 1–18 carbon atoms;
  b. styrene or acrylonitrile;
  c. a vinyl ester whose ester moiety contains 2–18 carbon atoms; or
  d. a vinyl ether;
X is the residue of a chain transfer agent;
Y is the residue of a di-, tri-, or tetraisocyanate radical after removal of isocyanate groups;
A is the residue of a mercapto-, hydroxy- or aminoalkyl alkoxy silane radical; and
m and n are 1, 2 or 3, the total not exceeding 4, provided that when n is 2 or 3, only one of A need be as defined.

2. The polymeric material of claim 1 wherein A is

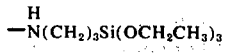

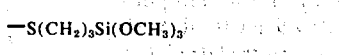

or

-continued

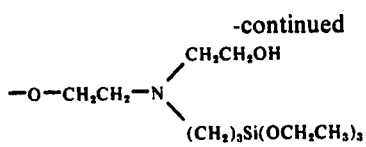

3. The polymeric material of claim 1 wherein Q is a polymeric segment one of whose monomer units is methyl methacrylate.

4. The polymeric material of claim 1 wherein Q is a polymeric segment of methyl methacrylate and an ester of acrylic acid or methacrylic acid with an alkanol of 2–12 carbon atoms.

5. The polymeric material of claim 1 wherein Q is a methyl methacrylate/2 ethylhexyl acrylate polymeric segment.

6. The polymeric material of claim 1 wherein X is

—S—R—Z where R is alkylene of 1—6 carbon atoms

Z is —O—, —S—, —C(=O)—O— or —NH.

7. The polymeric material of claim 1 where Y is

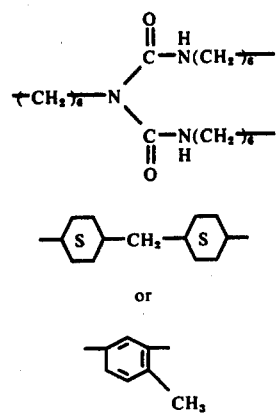

8. A polymeric material represented by the structure

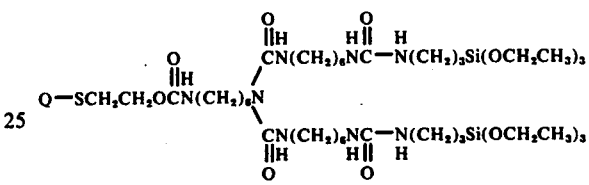

where Q is a resinous methyl methacrylate/2 ethylhexyl acrylate polymer segment.

* * * * *